Patented Apr. 18, 1944

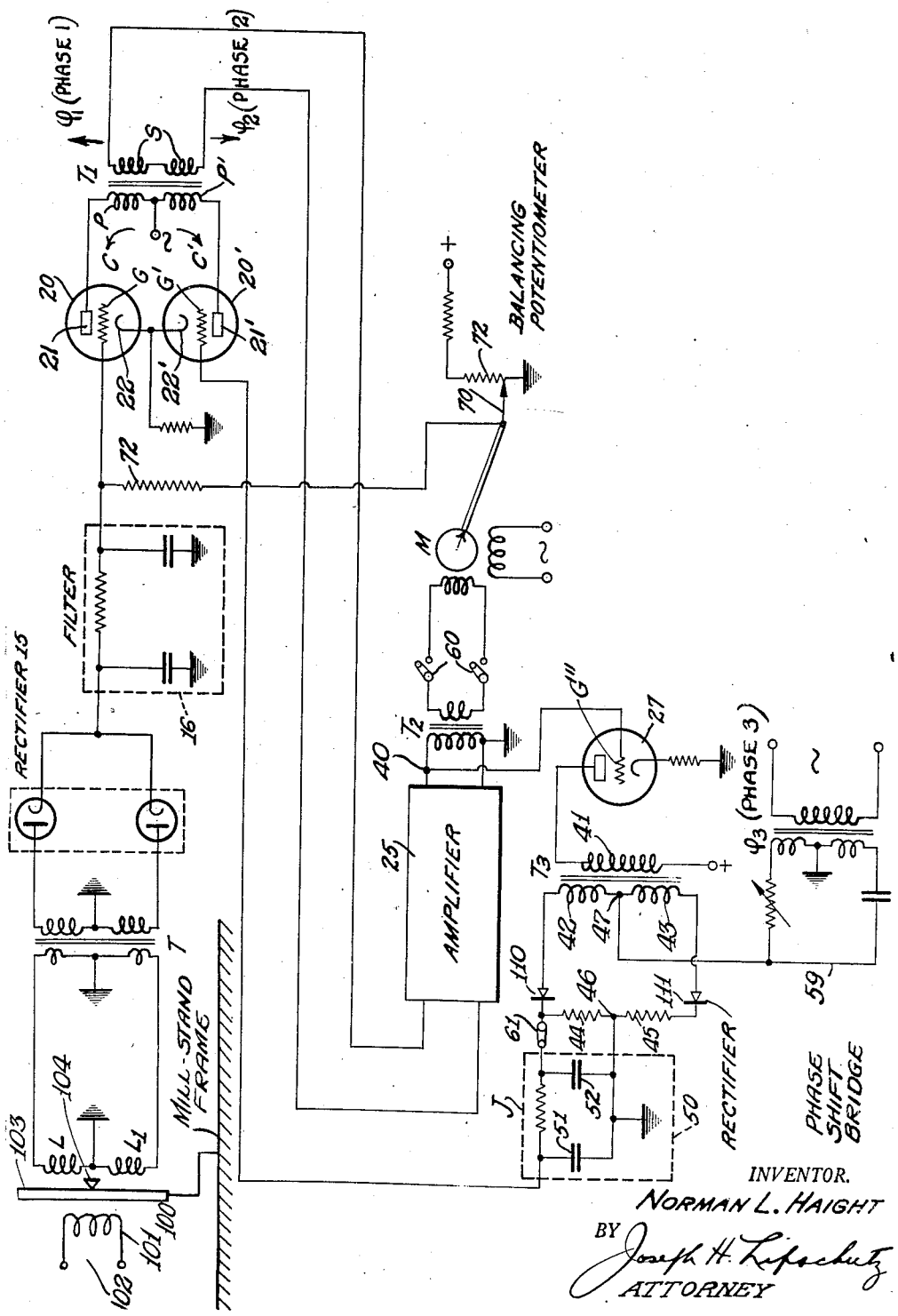

2,346,838

UNITED STATES PATENT OFFICE 2,346,838

FOLLOW-UP AND COMPENSATING SYSTEM

Norman L. Haight, Hoboken, N. J., assignor to Sperry Products, Inc., Hoboken, N. J., a corporation of New York Application July 29, 1942, Serial No. 452,715

10 Claims. (Cl. 172—239)

This invention relates to compensating systems, particularly those which may be employed for the purpose of effecting compensation for certain variable factors. At present, follow-up systems are employed which usually depend upon the unbalance of an electrical system which in turn sets into motion operating means including a motor and potentiometer for generating a compensating voltage. Such systems, however, involve the employment of moving parts such as motors, potentiometers with moving contact arms, etc., which parts require servicing and affect the reliability and the accuracy of the system.

It is the principal object of this invention to provide a compensating system wherein there are no moving parts but which depends entirely upon the electric characteristics. For this purpose I employ a thermionic system having a plurality of normally balanced thermionic circuits which are designed to become unbalanced in response to certain impulses, which unbalance generates the necessary voltages for again bringing the circuits into balance.

Further objects and advantages of this invention will become apparent in the following detailed description thereof.

The accompanying drawing is a wiring diagram illustrating the theory of this invention.

Referring to the drawing, there is shown a detector element which may be any impedance device, such as a plurality of induction coils L, L₁ which are designed to detect variations in flux which are a function of some factor to be measured. Thus, for instance, the coils L, L₁ may be the secondary windings of a transformer 100 whose primary coil 101 may be energized from any suitable source of A. C. power 102. The coils may operate in conjunction with an armature 103 whose movements may be controlled, for example by the elongation or strain in the frame of a rolling mill stand so that as the frame is subjected to strain the armature is actuated in relation to coils L, L₁ to vary the relative voltages induced in said coils and thus generate a differential voltage. The coils may be of substantially equal inductance, or they may be of different inductances, and they are arranged in series. For the purpose of this invention it is only important that the variations in flux in the factor to be measured shall change the normal voltages which are induced in the coils L and L₁. If there is a normal output, the voltage is transformed by the transformer T, rectified by the rectifier 15 to give pulsating D. C. which is then passed through a filter 16 to yield substantially continuous D. C. and this continuous D. C. is supplied to the balancing circuit. The balancing circuit may comprise two thermionic circuits C and C′ including thermionic elements 20 and 20′, and the current through each of these circuits may be supplied from a suitable source of A. C. current by way of two primary coils P and P′ to the plates 21 and 21′ of the thermionic elements. If the biases upon the grids G and G′ of the thermionic elements are the same, then equal current will flow between plate 21 and filament 22 and between plate 21′ and filament 22′. The currents flowing in the circuits C and C′ will be the same and thus no voltage will be generated in the secondary coil S of the transformer T₁. If, however, there is positive potential output from the filter 16 to the grid G, then there will be more current flowing in the circuit C than in the circuit C′, and a voltage of a given phase $\phi_1$ will be generated and of an amplitude depending upon the degree of bias on grid G. Current will then flow in the secondary coils S and, after being amplified by amplifier 25, will yield an output at 40.

If no compensation system were provided, current would continue to flow as long as D. C. was being supplied from the filter 16 to the grid G. The compensation is effected by tapping the output from amplifier 25 and applying this voltage to the grid G′ in the circuit C′ so as to bring the current flow in said circuit toward balanced condition with respect to the current flow in circuit C. The output from amplifier 25 may be tapped at point 40 and the voltage so tapped may be applied to the grid G″ of an amplifier tube 27 which then impresses this output on one coil 41 of a transformer T₃ which impresses the voltage in turn upon secondary coils 42 and 43 forming two arms of a bridge comprising also the rectifiers 110, 111 and resistances 44 and 45. A source of voltage is impressed across the midpoints 46 and 47 of this bridge in a manner and for the purpose to be described hereinafter. The output from one branch of the bridge is passed through a long time delay filter 50 and the output from said filter is in turn impressed upon the grid G′ of the tube 20′. As the bias on grid G′ approaches equality with the bias on grid G, the current in circuit C′ will approach equality with that in circuit C so that the output from the transformer T₁ is reduced toward zero. The output, however, is never quite equal to zero because of the loss in power factors between the point 40 and the grid G′, so that a normal, small output is obtained from transformer T₁ but insufficient to cause rotation of motor M. Let us now apply this system to the indication of pressure existing between the rolls of a rolling mill. When material passes between the rolls, the mill frame is stretched or strained, and this strain is caused to operate armature 103 (see patent to Bagno, No. 2,276,816, granted March 17, 1942) to rock the same around its pivot 104 and vary the air gaps between it and the coils. This generates a differential voltage in coils L, L₁, over above any voltage (or zero voltage) which was present before, and this additional voltage will generate a voltage in secondary coils S, and after being amplified by amplifier 25 may be caused to operate any suitable indicator. For example, the output from amplifier 25 may induce voltage in transformer T₂, the output of which may operate a voltmeter or a follow-up type indicator, as shown. That is, the output from transformer T₂ may energize a motor M which operates an indicator arm 70 in the form of a potentiometer contact over potentiometer 72. The voltage taken off potentiometer 72 may be applied to the grid of tube C in a direction opposite to the voltage applied by the output of coils L and L₁. When these are equal, the motor M stops and the position of contact arm 70 is an indicator of the unbalance of transformer 100.

It must now be observed that factors other than material passing between the rolls of the rolling mill frame may cause strain therein and thus actuate armature 103. Thus, temperature may introduce a substantial strain in the frame. Since it is desired to indicate only the increment of strain in the mill frame caused by material passing between the rolls, it will be seen that the strain introduced by such a factor as temperature will result in an error in the indication of strain when material passes through the rolls. Therefore, the system just described may be utilized to compensate for the effect of all voltages generated when material is not passing through the rolls, so that when material does pass through the rolls only the increment due to strain caused by the material will be indicated. For this purpose switches 60 and 61 are provided on the mill stand in such relation that when no material is passing through the mill-stand, switches 60 are open and switch 61 closed, while when material passes through the mill-stand, switches 60 are closed and switch 61 is opened.

Thus, when no material is passing through the mill-stand, switches 60 are open and switch 61 is closed. This means that any voltages generated in coils L and L₁, either because of temperature variations, unbalance in coils L and L₁, or for any other reason, will be compensated for by the feedback from 40 to the grid C' until the currents flowing in circuits C and C' are substantially equal and there is substantially no output from coils S. In other words, a zero base line is being continuously reestablished during the interval when no material is passing through the mill-stand, i. e., during the interval that switch 61 is closed and switches 60 are open. As soon as material enters the rolls, switch 61 is opened and switches 60 are closed, so that the increment in strain caused by the material passing through the rolls will be indicated either by the meter or by the balancing potentiometer. This indication will be free of the errors of temperature, etc. introduced, and compensated for before the material entered the rolls.

When the signal is picked up by the impedance members L, L₁, the bias on grid G becomes such that the current in circuit C exceeds that of the current in circuit C', in which case it is desired to build up the bias on G' and hence the current in C' to bring the system again into balance. Similarly, when the bias on G drops and the bias on G' exceeds G, it is necessary to reduce the bias on G' and hence the current in C' in the other direction, again to effect balance. In other words, the balancing system must have a directional sense. For this purpose there is provided the bridge network hereinbefore described consisting of members 42, 43, 44, 45, 110, 111 and the source of voltage connected across the points 46 and 47. The source of voltage may comprise a phase shift bridge 59 so that the phase of the voltage which is impressed on the branches of the bridge may be selected. The selection of the phase is such that the voltage impressed on one branch of the bridge, for instance the upper branch shown in the drawing, will be in phase with that pulse which comes out of the amplifier 25 when the current in circuit C exceeds that of the current in circuit C' and will be out of phase with the pulse which comes from the amplifier 25 when the current in C' exceeds the current in C. The bridge is provided with rectifier elements so that it is unidirectional. Thus the voltage normally impressed on the bridge across points 46 and 47 is of such phase as to add to the pulse which comes from amplifier 25 when the current in circuit C exceeds the current in circuit C'. This means that if the voltage generated in winding S when the current in circuit C exceeds the current in circuit C₁ is of phase $\phi_1$, then the phase impressed by bridge 59 across points 46 and 47 is selected to be of phase $\phi_1$. This increases the bias on G', which is desirable because it is in a direction to tend to restore the bias on G' to equality with the bias on G. However, when the current in C' exceeds the current in C, then the voltage generated in winding S and impressed on the bridge is of phase $\phi_2$ opposite to that of the phase $\phi_1$ of the voltage in the upper branch of the bridge and therefore the output is diminished to give a reduced bias on grid G', which is also desired because in this state of the device it is desired to reduce the current in C'. Thus a direction sense is imparted to the balancing mechanism.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. A thermionic compensating system comprising a pair of balanced thermionic circuits, means whereby impressing a signal on one circuit disturbs said balance and generates a voltage, and means whereby said generated voltage impresses a signal on the other circuit in a direction to restore said balance.

2. A thermionic compensating system comprising a pair of balanced thermionic circuits, means whereby impressing a signal on one circuit disturbs said balance and generates a voltage, and means whereby said generated voltage impresses a signal on the other circuit in a direction to restore said balance, said last named means including a direction sense circuit having voltage of a predetermined phase selected to synchronize with the phase of the voltage generated when said balance is disturbed in one direction and to be out of synchronism with the phase of the voltage generated when said balance is disturbed in the opposite direction, and means for impressing the generated voltage on the direction sense circuit.

3. A thermionic compensating system comprising a pair of balanced thermionic circuits, means whereby impressing a signal on one circuit disturbs said balance and generates a voltage, and means whereby said generated voltage impresses a signal on the other circuit in a direction to restore said balance, said last named means including a time delay device.

4. A thermionic compensating system comprising a pair of balanced thermionic circuits, means whereby impressing a signal on one circuit disturbs said balance and generates a voltage, an operating mechanism, means whereby said mechanism is operated by said generated voltage only when said voltage exceeds a predetermined amount, and means whereby said generated voltage impresses a signal on the other circuit in a direction to restore said balance.

5. In a device for indicating variations in flux, impedance means responsive to said variations, means for rectifying the output of said impedance means, a pair of balanced thermionic circuits, means for impressing said rectified output on one of the circuits to disturb said balance, means whereby disturbance of said balance generates a voltage, an operating mechanism, means whereby said voltage actuates said mechanism, and means whereby said voltage impresses a signal on the other circuit in a direction to restore said balance.

6. In a device for indicating variations in flux, impedance means responsive to said variations, means for rectifying the output of said impedance means, a pair of balanced thermionic circuits, means for impressing said rectified output on one of the circuits to disturb said balance, means whereby disturbance of said balance generates a voltage, an operating mechanism, means whereby said voltage actuates said mechanism only when said voltage exceeds a predetermined amount, and means whereby said voltage impresses a signal on the other circuit in a direction to restore said balance.

7. In a thermionic compensating device for operating mechanisms, an impedance responsive member, means whereby the operation of said operating mechanism varies the impedance of said member, means whereby variations in impedance of said impedance member generates a signal, a pair of balanced thermionic circuits, means for impressing said signal on one of said circuits to unbalance said circuits and generate a voltage, an actuated member adapted to be actuated by said generated voltage, means whereby said voltage impresses a compensating signal on the second circuit in a direction to restore said balance when said operating mechanism is in inoperative condition, and means whereby said generated voltage impresses a signal on the first circuit in a direction to restore said balance when said operating mechanism is in operative condition.

8. In a thermionic compensating device for operating mechanisms, an impedance responsive member, means whereby the operation of said operating mechanism varies the impedance of said member, means whereby variations in impedance of said impedance member generates a signal, a pair of balanced thermionic circuits, means for impressing said signal on one of said circuits to unbalance said circuits and generate a voltage, an actuated member adapted to be actuated by said generated voltage, means whereby said voltage impresses a compensating signal on the second circuit in a direction to restore said balance when said operating mechanism is in inoperative condition, means whereby said generated voltage impresses a signal on the first circuit in a direction to restore said balance when said operating mechanism is in operative condition, and means whereby said compensating means is rendered inoperative and the compensating signal on the second circuit is maintained substantially constant when said operating mechanism is rendered operative.

9. In a thermionic compensating device for strain gauges of rolling mills and for similar devices having a strain responsive member and means whereby said member generates a signal which is a function of the strain, a pair of balanced thermionic circuits, means for impressing said signal on one of said circuits to unbalance said circuits and generate a voltage, compensating means whereby said generated voltage impresses a compensating signal on the second circuit in a direction to restore said balance when no material is passing through the rolling mill, and operating means whereby said generated voltage impresses a signal on the first circuit in a direction to restore said balance when material is passing through the rolling mill.

10. In a thermionic compensating device for strain gauges of rolling mills and for similar devices having a strain responsive member and means whereby said member generates a signal which is a function of the strain, a pair of balanced thermionic circuits, means for impressing said signal on one of said circuits to unbalance said circuits and generate a voltage, compensating means whereby said generated voltage impresses a compensating signal on the second circuit in a direction to restore said balance when no material is passing through the rolling mill, operating means whereby said generated voltage impresses a signal on the first circuit in a direction to restore said balance when material is passing through the rolling mill, and means whereby said compensating means is rendered inoperative and the compensating signal on the second circuit is maintained substantially constant when said operating means is rendered effective.

NORMAN L. HAIGHT.